(12) United States Patent
Ono et al.

(10) Patent No.: US 8,599,509 B2
(45) Date of Patent: Dec. 3, 2013

(54) MAGNETIC RECORDING MEDIUM HAVING NON-MAGNETIC SEPARATING REGIONS AND METHODS OF MANUFACTURING THE SAME

(75) Inventors: Toshinori Ono, Tama (JP); Tatsuya Hinoue, Odawara (JP); Hiroshi Yakushiji, Yokohama (JP)

(73) Assignee: HGST Netherlands B.V., Amsterdam (NL)

( * ) Notice: Subject to any disclaimer, the term of this patent is extended or adjusted under 35 U.S.C. 154(b) by 214 days.

(21) Appl. No.: 12/917,372

(22) Filed: Nov. 1, 2010

(65) Prior Publication Data
US 2011/0128649 A1    Jun. 2, 2011

(30) Foreign Application Priority Data
Dec. 2, 2009    (JP) .................................. 2009-274466

(51) Int. Cl.
*G11B 5/66*    (2006.01)
*G11B 5/706*    (2006.01)
*G11B 5/09*    (2006.01)

(52) U.S. Cl.
USPC .............................. 360/48; 428/827; 428/848

(58) Field of Classification Search
None
See application file for complete search history.

(56) References Cited

U.S. PATENT DOCUMENTS

| 6,014,296 A | 1/2000 | Ichihara et al. |
| 6,665,145 B2 | 12/2003 | Wada |
| 7,352,529 B2 * | 4/2008 | Hibi et al. ..................... 360/135 |
| 2002/0018920 A1 * | 2/2002 | Yamamoto et al. ..... 428/694 TS |
| 2002/0055018 A1 * | 5/2002 | Takeshita et al. ....... 428/694 SG |
| 2009/0081482 A1 | 3/2009 | Kimura et al. |
| 2011/0032635 A1 * | 2/2011 | Fukushima ..................... 360/75 |

FOREIGN PATENT DOCUMENTS

| JP | 09/097419 A | 4/1997 |
| JP | 2000/298822 A | 10/2000 |
| JP | 2001/101651 A | 4/2001 |
| JP | 2008/159146 A | 10/2008 |
| JP | 2009/080902 A | 4/2009 |
| JP | 2009252281 | * 10/2009 |

* cited by examiner

*Primary Examiner* — Regina N Holder
(74) *Attorney, Agent, or Firm* — Zilka-Kotab, PC (57) ABSTRACT

In one embodiment, a magnetic recording medium includes a patterned magnetic recording layer above a substrate, the patterned magnetic recording layer including recording regions and separating regions for separating the recording regions and a non-magnetic alloy layer positioned in the separating regions, wherein the non-magnetic alloy layer includes Ti. In another embodiment, a method for producing a magnetic recording medium includes forming separating regions in a magnetic recording layer by removing portions of the magnetic layer, wherein the separating regions separate recording regions in the magnetic layer, and depositing a non-magnetic alloy layer in the separating regions. Other media and methods are described according to more embodiments.

25 Claims, 9 Drawing Sheets

Gd cannot be reduced

(a) difference in level Gd after Refill for Lh 20 nm and film thickness 30 nm

(b) difference in level Gd (nm)

(a) difference in level Gd after Refill for Lh 20 nm and film thickness 30 nm (b) difference in level Gd (nm)

| Ti/(Ti+Al) at% | Lh20nm, 30nm | | | Refill | Gd |
| --- | --- | --- | --- | --- | --- |
| | Gw: 20nm | Gw: 50nm | Gw: 100nm | Gw: 200nm | Gw: 300nm |
| 0 | 4.9 | 15.9 | 17.7 | 20.5 | 18.5 |
| 10 | 5.2 | | 17.3 | | 17.2 |
| 20 | 3.5 | | 14.9 | | 14.7 |
| 30 | 2.9 | | 12.7 | | 12.1 |
| 40 | 5.1 | | 9.8 | | 12.7 |
| 50 | 5.3 | 6.4 | 10.6 | 9.9 | 12.2 |
| 60 | 3.9 | | 10.5 | | 12.4 |
| 70 | 3.8 | | 12.2 | | 12.1 |
| 80 | 4.7 | | 14.1 | | 16.2 |
| 90 | 4.3 | | 15.7 | | 16.3 |
| 100 | 7.2 | 14.9 | 16.8 | 20.8 | 21.1 |

(a) difference in level Gd after Refill for Lh 20 nm and film thickness 30 nm (b) difference in level Gd (nm)

Figure 11

(a) difference in level Gd after Refill for Lh 20 nm and film thickness 30 nm (b) difference in level Gd (nm)

MAGNETIC RECORDING MEDIUM HAVING NON-MAGNETIC SEPARATING REGIONS AND METHODS OF MANUFACTURING THE SAME

RELATED APPLICATIONS

The present application claims priority to a Japanese Patent Application filed Dec. 2, 2009 under Appl. No. 2009-274466, which is incorporated herein by reference.

FIELD OF THE INVENTION

The present invention relates to patterned magnetic media having non-magnetic separating regions for discrete track media and bit patterned media which are suitable for a high recording density, and to methods for producing the same.

BACKGROUND OF THE INVENTION

Magnetic disk devices are commonly used in electronics devices needing storage, such as large computers, work stations, personal computers, etc. These devices are becoming more and more important, and developments toward greater capacity and smaller size are being sought. Increased density is essential for increasing the capacity of magnetic disk devices and making these devices more compact.

One method of increasing the density of magnetic disk devices involves a decrease in the medium noise caused by reducing the magnetization inversion units of the magnetic recording medium. Conventional magnetic recording media employ a structure in which the ferromagnetic crystal grains which form the magnetic recording layer are separated by a non-magnetic material which is already contained in the magnetic recording layer.

One attempt for enhancing density by controlling these non-magnetic materials involves discrete track media (DTM) in which processing is carried out in order to provide separation between recording tracks, and also bit patterned media (BPM) in which processing is carried out in order to provide separation between recording bits, and in both cases the technology for forming separating regions is an important factor in increasing the density.

One type of magnetic film processing in which a magnetic film is physically processed by etching or the like has been attempted as a method for producing DTM. Magnetic film-processed DTM are generally produced by the following processes: (1) a metal thin film is provided on the recording layer and a resist is applied; (2) a micropattern is applied to the resist by lithography technology or the like; (3) the metal thin film in the recesses of the resist pattern is etched via a dry process, and the recording layer is exposed; (4) the exposed recording layer is etched via a dry process, and recording track separating parts (grooves) are formed; (5) the residual resist and metal thin film in the recording tracks (lands) are removed. (6) The groove areas are back-filled with a non-magnetic material and planarized. (7) A protective layer and a lubricant layer are applied. Various types of research and development are currently being carried out in order to improve the precision of each process.

Various production methods have been proposed in relation to the back-filling and planarization process, and oxides, nitrides, carbides, and borides are generally used therein. Japanese Unexamined Patent Application Publication No. H9-97419 proposes a method in which the separating regions comprise oxides such as $SiO_2$, $Al_2O_3$, $TiO_2$; nitrides such as $Si_3N_4$, AlN, TiN; carbides such as TiC; and borides such as BN; or polymeric compounds based on any of C, CH, and CF; furthermore, Japanese Unexamined Patent Application Publication No. 2000-298822 proposes a method in which the separating regions nitrides comprise oxides such as $SiO_2$, $Al_2O_3$, $TiO_2$; nitrides such as $Si_3N_4$, AlN, TiN; carbides such as TiC; and borides such as BN; and polymeric compounds based on any of C, CH, and CF.

Furthermore, Japanese Unexamined Patent Application Publication No. 2009-080902 suggests some metal nitrides, such as C, Si, Ti, V, Cr, Ni, Cu, Ga, Y, Zr, Nb, Mo, Hf, Ta, W, and Al, or alloys thereof.

In addition, Japanese Unexamined Patent Application Publication No. 2008-159146 discloses back-fill materials comprising oxides, nitrides, and borides, in addition to Al, Ti, Cr, and Cr alloy, NiTa, $TiO_x$, $Al_2O_3$, Ru, and Ta, for example, but there is no reference to effects or modes of embodiment.

SUMMARY OF THE INVENTION

In one embodiment, a magnetic recording medium includes a patterned magnetic recording layer above a substrate, the patterned magnetic recording layer including recording regions and separating regions for separating the recording regions and a non-magnetic alloy layer positioned in the separating regions, wherein the non-magnetic alloy layer includes Ti.

In another embodiment, a method for producing a magnetic recording medium includes forming separating regions in a magnetic recording layer by removing portions of the magnetic layer, wherein the separating regions separate recording regions in the magnetic layer, and depositing a non-magnetic alloy layer in the separating regions.

In yet another embodiment, a magnetic recording medium includes a ferromagnetic layer for recording data or servo signal data, separating regions disposed between areas of the ferromagnetic layer, and a non-magnetic alloy layer including Ti positioned in each of the separating regions, wherein the separating regions comprise a number of regions having one or more different widths.

According to another embodiment, a magnetic recording medium includes a data track region for storing data, a servo region for storing servo data for controlling head position, and a non-magnetic alloy layer including Ti positioned in first separating regions and second separating regions. The data track region includes the first separating regions, each first separating region having a first width and a ferromagnetic layer for recording data positioned separately adjacent to the first separating regions. The servo region includes the second separating regions having a number of widths greater than the first width and a ferromagnetic layer positioned separately adjacent to the second separating regions.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 1(*a*) is a main-part view in cross section showing the situation when the separating regions in a region having a small pattern size have been back-filled with a conventional non-magnetic material, according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a magnetic recording medium includes a patterned magnetic recording layer above a substrate, the patterned magnetic recording layer including recording regions and separating regions for separating the recording regions and a non-magnetic alloy layer positioned in the separating regions, wherein the non-magnetic alloy layer includes Ti.

In another general embodiment, a method for producing a magnetic recording medium includes forming separating regions in a magnetic recording layer by removing portions of the magnetic layer, wherein the separating regions separate recording regions in the magnetic layer, and depositing a non-magnetic alloy layer in the separating regions, wherein the non-magnetic alloy layer comprises Ti.

In yet another general embodiment, a magnetic recording medium includes a ferromagnetic layer for recording data or servo signal data, separating regions disposed between areas of the ferromagnetic layer, and a non-magnetic alloy layer including Ti positioned in each of the separating regions, wherein the separating regions comprise a number of regions having one or more different widths.

According to another general embodiment, a magnetic recording medium includes a data track region for storing data, a servo region for storing servo data for controlling head position, and a non-magnetic alloy layer including Ti positioned in each first separating region and each second separating region. The data track region includes the first separating regions, each of the first separating regions having a first width and a ferromagnetic layer for recording data positioned separately adjacent to the first separating regions. The servo region includes second separating regions having a number of widths greater than the first width and a ferromagnetic layer positioned separately adjacent to the second separating regions.

The recording regions of magnetic recording media generally comprise a data track region for storing data, and a servo region for controlling the positioning of the data tracks. In patterned media such as discrete track media (DTM), the recording regions of the servo region and data track region are already divided by the separating regions, but the size and pitch of the recording regions and separating regions in the servo region are normally greater than those of the data track region. For example, in the servo region, the presence or absence of a ferromagnetic layer is used as "1" or "0" information in order to position the head, and when "0" is continuous, a region without the ferromagnetic layer is formed, and the distance between the areas of ferromagnetic layer increases. In the servo region, the width between the areas of ferromagnetic layer is not constant and a number of widths are mixed according to the number of zeroes and the placement thereof.

It is relatively difficult to back-fill and planarize the servo region compared with the data track region, and research shows that unevenness (steps or recesses) are likely to remain in the servo region, and in the end this has an adverse effect on the magnetic head floating properties.

The back-filling and planarization process normally involves forming a film via a dry process such as sputtering or chemical vapor deposition (CVD), or a wet process typified by spin on glass (SOG), after which etch-back is carried out via a dry process such as ion beam etching (IBE), reactive ion beam etching, or chemical mechanical polishing (CMP), and the excess film thickness is removed to produce the same height as the recording region. Wet processes such as SOG and CMP often adversely affect the floating properties and electromagnetic conversion characteristics of recording media because of residual microparticles, and dry processes are often selected. However, even if backfilling is carried out using the materials disclosed in Japanese Unexamined Patent Application Publication Nos. 2000-298822, 2009-080902, H9-97419, and 2008-159146, planarization does not readily proceed in regions where the pattern size and pitch exceeds 100 nm.

Figure 1A:
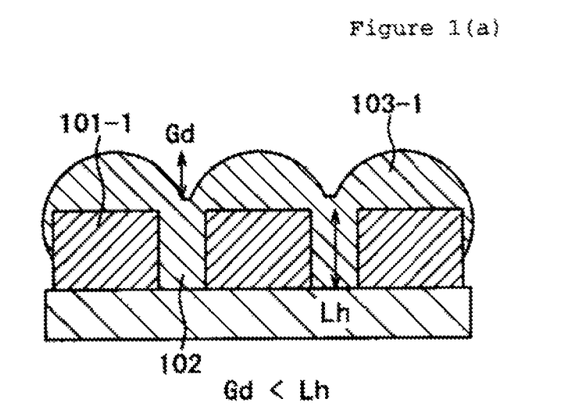
Figure 1B:
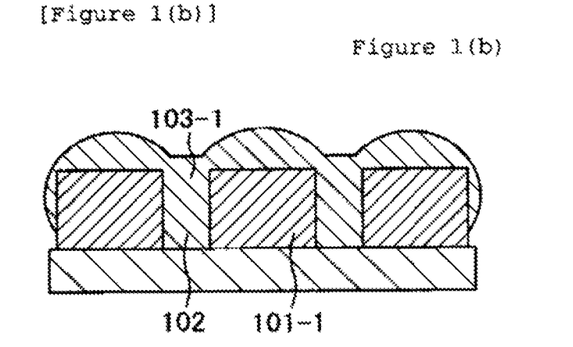
FIG. 1(b) is a main-part view in cross section showing the situation when the conventional nonmagnetic material layer back-filling the separating regions in a region having a small pattern size has been partly etched, according to one embodiment.
Figure 1C:
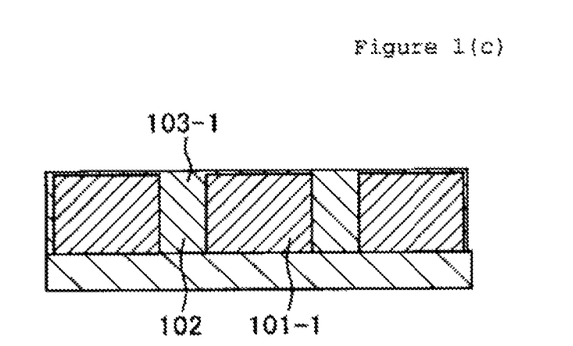
FIG. 1(c) is a main-part view in cross section showing the situation when the conventional nonmagnetic material layer back-filling the separating regions in a region having a small pattern size has been fully etched, according to one embodiment.
Figure 2A:
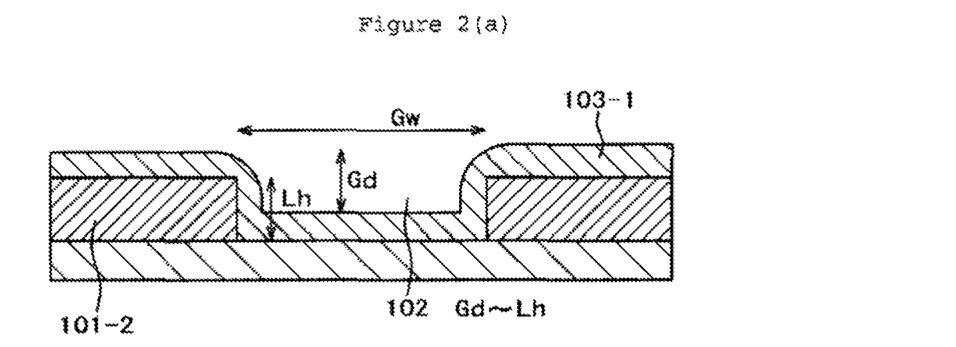
FIG. 2(a) is a main-part view in cross section showing the situation when the separating regions in a region having a large pattern size have been partly back-filled with a conventional non-magnetic material, according to one embodiment.
Figure 2B:
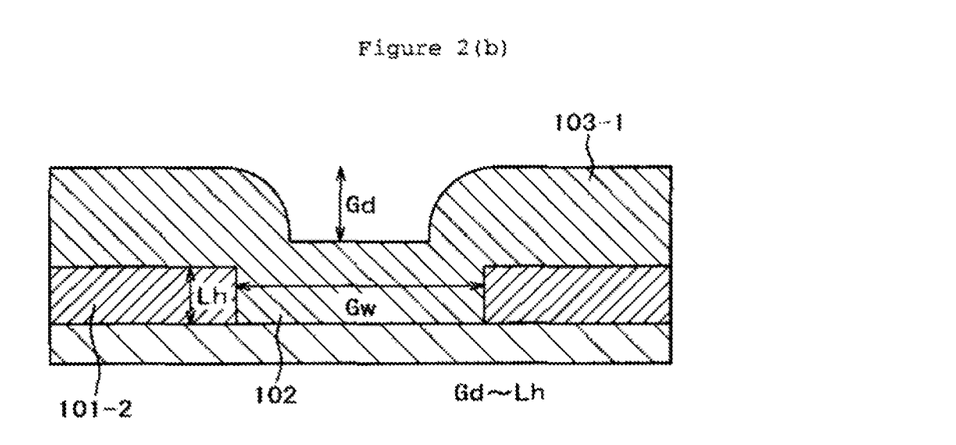
FIG. 2(b) is a main-part view in cross section showing the situation when the separating regions in a region having a large pattern size have been backfilled with a conventional non-magnetic material, according to one embodiment.
Figure 2C:
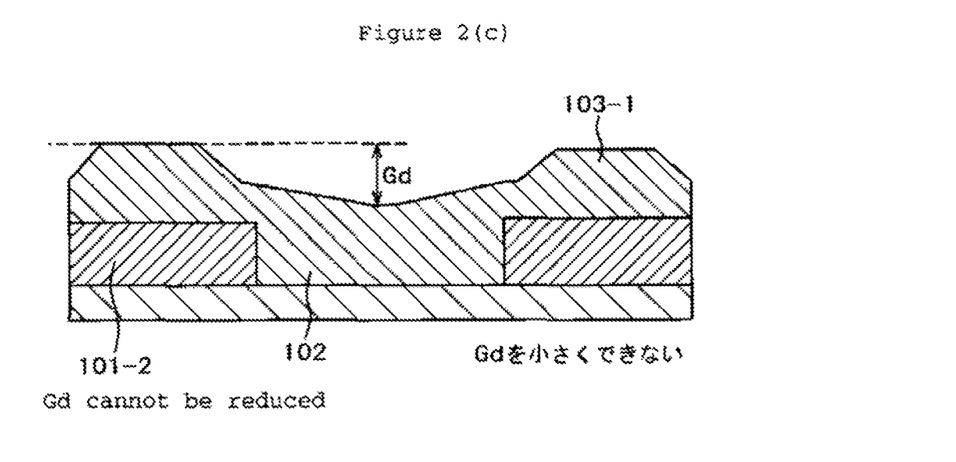
FIG. 2(c) is a main-part view in cross section showing the situation when the etching of the conventional non-magnetic material layer back-filling the separating regions in a region having a large pattern size has been completed, according to one embodiment.

This situation is described with the aid of FIGS. 1(a)-1(c) and FIGS. 2(a)-2(c). FIGS. 1(a)-1(c) show the state of the data track region wherein the pattern size of a recording layer (ferromagnetic layer) 101-1 is small, and the width of intervening separating regions 102 is small. FIGS. 2(a)-2(c) show the state of the servo region when the pattern size of a ferromagnetic layer 101-2 is large, and the width of intervening separating regions 102 is large.

In the track data region, the width of the separating regions 102 is small, and therefore if the separating regions are filled with non-magnetic material the difference (Gd) between the surface of the non-magnetic material layer 103-1 formed on the recording layer (ferromagnetic layer) 101-1 and the non-magnetic material layer surface on the separating regions 102 is smaller than the height (Lh) of the recording layer (ferromagnetic layer) 101-1 (FIG. 1(a)), and the surface unevenness can be smoothed simply by forming the non-magnetic material layer. After this, the nonmagnetic material layer is etched so that the surface is planarized on the recording layer (ferromagnetic layer) 101-1 and in the separating regions 102, as shown in FIG. 1(c), via the state shown in FIG. 1(b).

Of course, when the width (Gw) of the separating regions 102 in the servo region is large and the non-magnetic material layer 103-1 is thin, as shown in FIG. 2(a), then the difference Gd between the surface of the non magnetic material layer 103-1 formed on the ferromagnetic layer 101-2 and the non-magnetic material layer surface on the separating regions 102 is virtually equal to the height Lh of the ferromagnetic layer 101-2, even if the non-magnetic material layer is formed to be thin, and the surface unevenness is not smoothed even by the formation of the non-magnetic material film 103-1. After this, the lands which are large in size are reduced in size, but even if the non-magnetic material layer 103-1 is subjected to etch-back, the height is not readily reduced in the center because of the effect of etching re-adhesion, and it is difficult to planarize the whole surface (FIG. 2(c)), according to one embodiment.

This is because in the areas where the pattern is small in size, such as in the data track region, the grooves are comparatively easily back-filled via film growth from both the longitudinal and transverse directions so that planarization readily occurs after etch-back, whereas in the areas where the pattern is large in size, such as in the servo region, film growth around the center of the grooves can only be achieved in the longitudinal direction. The difference in level Gd cannot therefore be easily reduced. The grooves formed in this way are difficult to planarize after etch-back. The back-filling and planarization process affects the final surface shape of the completed media, and whether or not this process is successful may determine the magnetic head floating properties, according to one approach.

According to one embodiment, a separated recording region magnetic recording medium with separating regions comprising a non-magnetic layer between recording regions comprising a ferromagnetic layer is provided which has excellent magnetic head floating properties even if the in-plane distances between the areas of ferromagnetic layer are different. Also, in one embodiment, a method for producing a magnetic recording medium as described above is provided.

One embodiment includes a magnetic recording medium in which a magnetic recording layer is formed on a substrate, directly or with at least an inter layer interposed, wherein the magnetic recording layer is a patterned medium having recording regions and separating regions for separating the recording regions, and a non-magnetic alloy layer including Ti is positioned in the separating regions.

Furthermore, a method for producing the magnetic recording medium includes processing the magnetic recording layer in order to form the recording regions and forming separating regions by sputtering, employing a substrate bias.

Furthermore, the recording medium has a ferromagnetic layer that can record data or servo signals, and separating regions which are disposed between the areas of ferromagnetic layer in one approach, with the separating regions comprising a number of regions of different widths, and a non-magnetic alloy layer including Ti being positioned in each of the number of separating regions having different widths.

By forming the non-magnetic alloy layer including Ti in the separating regions, it is possible to provide a separated recording region magnetic recording medium having excellent magnetic head floating properties, with which it is possible to reduce the grooves in the recording regions and separating regions, even in regions having a large pattern size, such as the servo region, according to one approach.

In order to resolve issues with the prior art as described previously, the following configuration may be used. That is to say, the magnetic recording medium may have a configuration in which a recording layer is formed on a substrate, directly or with at least an interlayer interposed, and the magnetic recording layer may be a patterned medium comprising recording regions and separating regions for separating the recording regions, and the separating regions may comprise a non-magnetic alloy including Ti. The non-magnetic alloy including Ti may have an amorphous structure to make it more effective.

Figure 3:
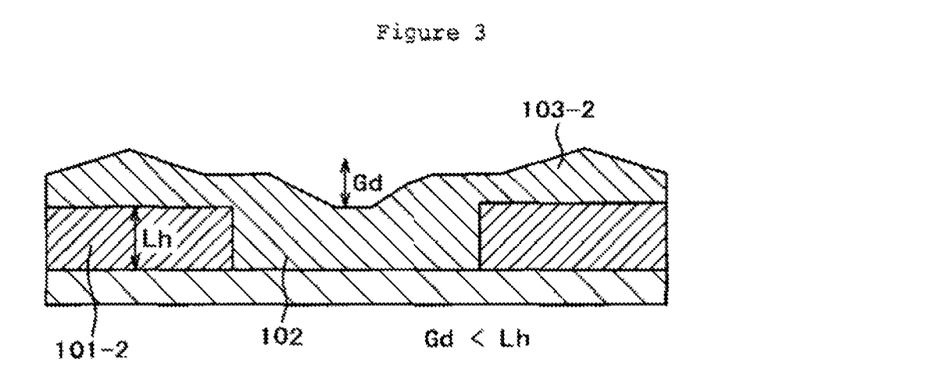
FIG. 3 is a main-part view in cross section showing the situation when the non-magnetic material according to a mode of embodiment is used to back-fill the separating regions in a region having a large pattern size, according to one embodiment.

FIG. 3 shows a situation when separating regions 102 in the servo region have been back-filled with a non-magnetic alloy layer 103-2 including Ti, which serves as the non-magnetic material layer, according to one embodiment. This configuration makes it possible to reduce the difference in level after the back-filling film formation, and it is possible to obtain a planar surface via the subsequent etch-back.

To explain further, when the separating regions in a magnetic recording medium of the patterned medium type comprising recording regions and separating regions for separating the recording regions include at least one non-magnetic amorphous alloy from among TiCr, TiCo, and TiAl, it is possible to produce a separated recording region magnetic recording medium which has excellent head low-floating properties and is suitable for higher density recording.

This is because it is possible to reduce the size of the grooves in not only the data track region, but also in the servo region which has a relatively large pattern size and pitch by using at least one nonmagnetic amorphous alloy from among TiCr, TiCo, and TiAl for the separating regions, and since it is also possible to reduce surface roughness, the floating base level of the magnetic head can be brought closer, and the distance between the recording regions and the magnetic head can be reduced, according to preferred embodiments.

A non-magnetic amorphous alloy may be used when the compositional proportion of Ti is set between about 30 at % to about 70 at % in the case of TiCr, between about 30 at % and about 70 at % in the case of TiCo, and between about 20 at % and about 80 at % in the case of TiAl. However, the compositional proportion of Ti is more preferably set between about 40 at % and about 60 at % in the case of TiCr, between about 40 at % and about 60 at % in the case of TiCo, and between about 30 at % and about 70 at % in the case of TiAl, in order to be able to reduce the size of the grooves in the servo region, also, according to some embodiments.

It should be noted that the examples described herein relate to a case in which the servo region is the region having large separating regions, but the embodiments described herein are not limited to this case, and may be applied to situations where the data region is the region having large separating regions.

Figure 4:
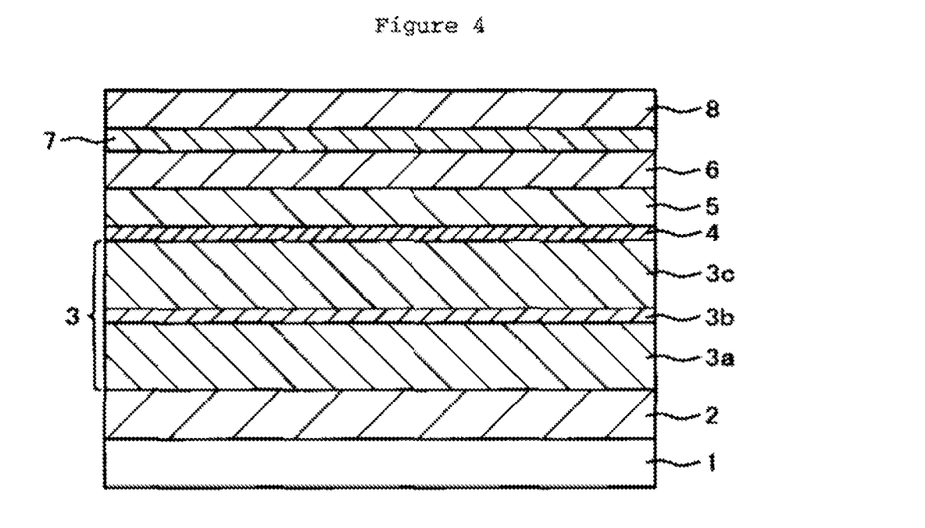
FIG. 4 is a schematic in cross section showing the steps for producing the magnetic recording medium according to a first exemplary embodiment.

According to a first exemplary embodiment, which is described with the aid of FIGS. 4-8, a magnetic recording medium is shown. FIGS. 4-7 are schematic cross-sectional views showing the steps for producing a separated recording region magnetic recording medium (magnetic disk) according to this exemplary embodiment. FIG. 4 shows a structure having the following stack of layers formed on a non-magnetic substrate (substrate) 1, an AlTi adhesion layer 2, a soft magnetic layer 3, an NiW seed layer 4, an Ru interlayer 5, a Co-based alloy granular magnetic layer (first recording layer) 6, a Co-based alloy magnetic layer (second recording layer) 7, and a Ta mask layer precursor 8. The soft magnetic layer 3 comprises the following stack of layers: a FeCo-based lower soft magnetic layer 3a, a Ru antiferromagnetic coupling layer 3b, and an FeCo-based upper soft magnetic layer 3c.

The steps up to and including the formation of the Ta mask layer precursor 8 on the non-magnetic substrate 1 are carried out in accordance with a normal production method, as will be described below.

A soda lime glass base (outer diameter 65 nm, inner diameter 15 nm, thickness 0.635 nm) was used as the substrate 1, which was thoroughly washed. This substrate 1 was then introduced into a vacuum tank which had been evacuated to no more than $1.3 \times 10^{-5}$ Pa ($1.0 \times 10^{-7}$ Torr). The substrate was initially conveyed to the adhesion layer formation chamber, where the Al-50 at % Ti adhesion layer 2 was formed to 5 nm via DC magnetron sputtering under conditions of around 0.8 Pa (6 mTorr) in an Ar atmosphere.

The substrate was then conveyed to a lower soft magnetic layer Co-9 at % Ta-4 at % formation chamber, where a Fe-35 at % Zr alloy lower soft magnetic layer 3a was formed to 20 nm via DC magnetron sputtering under conditions of around 0.8 Pa (6 mTorr) in an Ar atmosphere. The substrate was then conveyed to an antiferromagnetic coupling layer formation chamber, where a Ru layer 3b was formed to 0.5 nm via DC magnetron sputtering under conditions of around 0.8 Pa (6 mTorr) in an Ar atmosphere. The substrate was then conveyed to an upper soft magnetic layer formation chamber, where a Fe-35 at % Co-9 at % Ta-4 at % Zr alloy upper soft magnetic layer 3c was formed to 20 nm via DC magnetron sputtering under conditions of around 0.8 Pa (6 mTorr) in an Ar atmosphere.

The substrate was then conveyed to a substrate cooling chamber, where the substrate temperature which had been raised due to the effects of the heat produced by the sputtering was lowered to 55° C., after which the substrate was placed in a seed layer formation chamber, where the Ni-8 at % W seed layer 4 was formed to 8 nm via DC magnetron sputtering under conditions of around 0.9 Pa (7 mTorr) in an Ar atmosphere.

The substrate was then placed in an inter layer formation chamber, where the Ru interlayer 4 was formed to 15 nm via DC magnetron sputtering under conditions of around 2 Pa (15 mTorr) in an Ar atmosphere. The substrate was placed in a magnetic recording layer formation chamber 1, where the granular magnetic layer (first recording layer) 6 comprising 90 mol % (Co-15 at % Cr-18 at % Pt) 8 mol % $SiO_2$ alloy was formed to 13 nm via DC magnetron sputtering under conditions of around 0.9 Pa (7 mTorr) in an Ar atmosphere, after which the substrate was conveyed to a magnetic recording layer formation chamber 2, where a Co-13 at % Cr-18 at % Pt-7 at % magnetic layer (second recording layer) 7 was formed to 7 nm via DC magnetron sputtering under conditions of around 0.8 Pa (6 mTorr) in an Ar atmosphere.

The substrate was then conveyed to a Ta mask layer precursor formation chamber, where a Ta mask layer precursor 8 was formed to 30 nm via DC magnetron sputtering under conditions of around 0.9 Pa (7 mTorr) in an Ar atmosphere.

Instead of the soda lime glass which was used for the substrate 1, it is possible to use a chemically-strengthened aluminosilicate substrate, an Ni—P electroless-plated Al—Mg alloy substrate, a nonmagnetic rigid substrate comprising silicon, a ceramic formed from borosilicate glass, a glass-glazed ceramic, etc.

The adhesion layer 2 is provided in order to prevent electrochemical elution of the alkali metals from the soda lime glass, and in order to improve the adhesion between the glass and the soft magnetic layer 3, and in addition to AlTi, it is also possible to employ NiTa, AlTa, CoTiAl, etc., and the thickness is immaterial. This layer may also be omitted if it is not particularly needed. Furthermore, a soft magnetic backing layer may also be provided between the adhesion layer 2 and the soft magnetic layer 3. A typical structure in this case would involve forming 6 nm of Ni-18-at % Fe, 17 nm of Fe-50 at % Mn, and 3 nm of Co-10 at % Fe in succession on the adhesion layer 2, and then providing the soft magnetic layer 3, according to one embodiment.

In some approaches, it is also possible to use NiFe alloy, NiTa alloy, TaTi alloy, etc., for the seed layer 4. Furthermore, NiCrTi alloy may be stacked between the seed layer 4 and the soft magnetic layer 3. The substrate cooling step may be performed before the upper soft magnetic layer 3c is formed or before the recording layer 6 is formed, rather than after the upper soft magnetic layer 3c is formed, or several such steps may be combined, in several embodiments.

Figure 5:
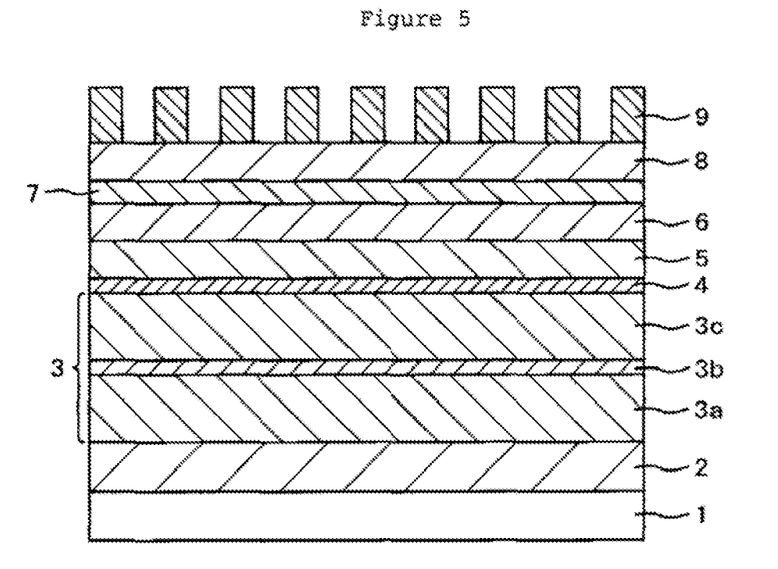
FIG. 5 is a schematic in cross section showing the steps for producing the magnetic recording medium according to the first exemplary embodiment.

Returning to the discussion of the first exemplary embodiment, the substrate 1 on which had been formed the layers up to and including the Ta mask layer precursor 8 was removed from the vacuum tank and introduced into a resist coater, where a methyl methacrylate resin (PMMA) layer 9 was formed to 60 nm as a resist material on the Ta mask layer precursor, after which the micropattern shown in FIG. 5 was formed by nanoimprint technology.

That is, the sputtering used to form the micropattern involved a copy of the data track region and servo region having a greater pattern size and pitch than the data track region, which included regions that could produce a concentric pattern in a shape where the width of the resist projections was 90 nm, the widths of the resist recesses were 20 nm, 50 nm, 100 nm, 200 nm, and 300 nm, and the resist residue was 5 nm.

Figure 6:
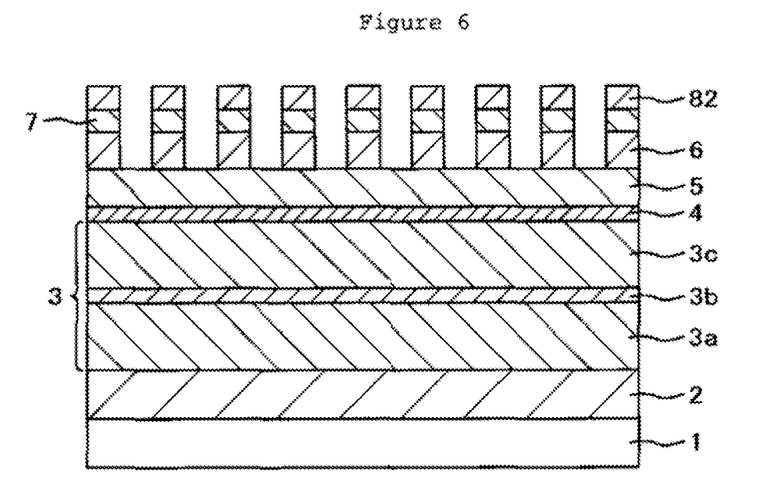
FIG. 6 is a schematic in cross section showing the steps for producing the magnetic recording medium according to the first exemplary embodiment.

The substrate which had been provided with layers up to and including the PMMA layer 9 having the micropattern was then introduced into a different vacuum apparatus from the one used to form the layers up to and including the Ta mask layer precursor 8, and a Ta mask layer 82 was formed. The substrate was conveyed to the reactive oxygen ion etching (RIE-02) chamber, and 5 nm of the resist residue was removed. The substrate was then conveyed to the reactive $CF_4$ ion etching chamber, and the Ta mask layer was formed. The substrate was then conveyed to the Ar ion beam etching (IBE) chamber, and the granular magnetic layer (first recording layer) 6 and Co-based alloy magnetic layer (second recording layer) 7 which were already under the Ta mask layer were etched to 13 nm and 7 nm, respectively. The magnetic recording medium, in one approach, which had passed through the steps until this point is shown schematically in cross-section in HG. 6.

Figure 7:
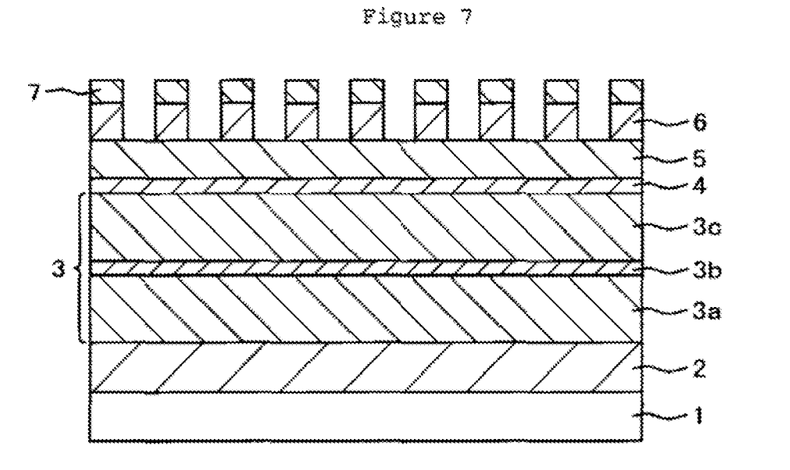
FIG. 7 is a schematic in cross section showing the steps for producing the magnetic recording medium according to the first exemplary embodiment.
Figure 8:
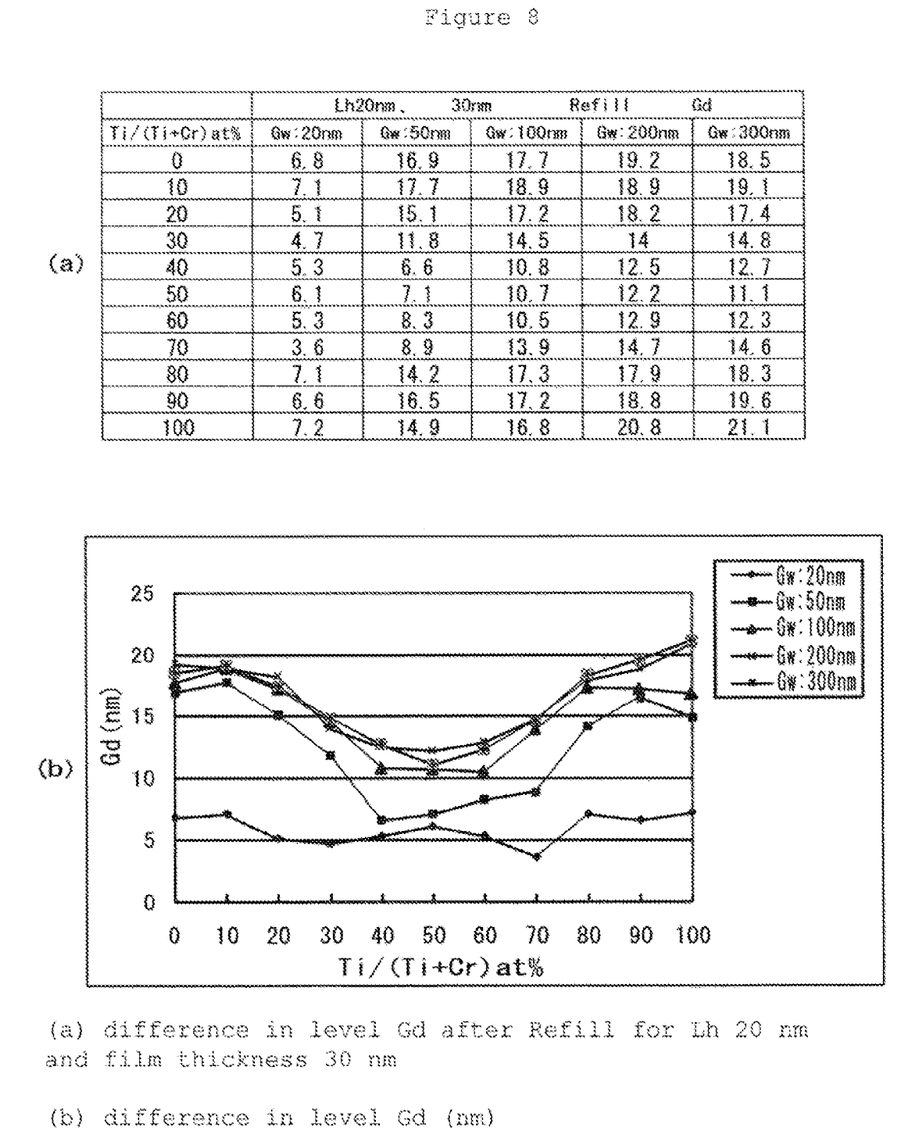
FIGS. 8(a) and 8(b) illustrate the dependency of the difference in level Gd on the Ti compositional proportion when TiCr alloy is used as the back-fill material with a magnetic film processed depth of 20 nm and a back-fill film thickness of 30 nm in the magnetic recording medium according to the first exemplary embodiment, where 8(a) shows data the data and 8(b) is a graph produced from in 8(a).

The substrate was then conveyed to the reactive $CF_4$ ion etching chamber, and the Ta mask layer was completely removed via $CF_4$ ion etching, and the structure shown in FIG. 7 was produced. A plurality of samples of the structure shown in FIG. 7 were prepared, and the back-fill and planarization samples shown below were produced, but many other structures are possible, according to various embodiments.

In samples where the magnetic film projections were etched to a width of 90 nm, the recesses were etched to widths (Gw) of 20 nm, 50 nm, 100 nm, 200 nm, and 300 nm, and the depth was etched to 20 nm (the structure shown in FIG. 7). These structures were conveyed to the sputtering film formation chamber without being exposed outside the vacuum, and an alloy thin film of 30 nm was formed on the magnetic film surface which was processed using a TiCr alloy target.

The Ti compositional proportion in the alloy target used was set at 10 at %, 20 at %, 30 at %, 40 at %, 50 at %, 60 at %, 70 at %, 80 at %, and 90 at %, and a pure Ti target and a pure Cr target were also used for the purposes of comparison. FIGS. 8(a) and 8(b) illustrate the Ti compositional proportion dependency of the difference in level Gd for each Gw, where 8(a) shows data and 8(b) is a graph produced from the data in 8(a).

When Gw was 20 nm, Gd did not change by a great amount regardless of the Ti compositional proportion. However, as Gw increased, Gd showed dependency on the compositional proportion of Ti, and when there was 30 at % to 70 at % of Ti, Gd could be kept to 15 nm or less, despite the fact that these were regions where it could not normally be hoped that simple back-fill could produce planarization with Gw at high levels of 100 nm, 200 nm, and 300 nm. When there was 40 at % to 60 at % of Ti in particular, Gd could be kept to 13 nm or less. In other words, it is clear that TiCr alloy is an effective material for back-fill and planarization, and a compositional proportion of Ti exhibiting amorphous properties of 30 at % to 70 at %, in particular 20 at % to 60 at %, is effective, according to various embodiments.

The samples were etched by IBE or a gas cluster ion beam (GCIB), and the excess film thickness of the back-fill film was removed. The etching effect and the re-adhesion effect were balanced so that the difference in level in the recording regions and separating regions could be kept to no more than 2 nm, even in the servo region, and it was possible to obtain a surface shape that had excellent magnetic head floating properties.

As described above, this exemplary embodiment makes it possible to provide a separated recording region magnetic recording medium which is provided with separating regions comprising a non-magnetic layer between recording regions comprising a ferromagnetic layer, and has excellent magnetic head floating properties even if the in-plane distances between the areas of ferromagnetic layer are different. Also, this exemplary embodiment makes it possible to provide a method for producing this magnetic recording medium.

Figure 9:
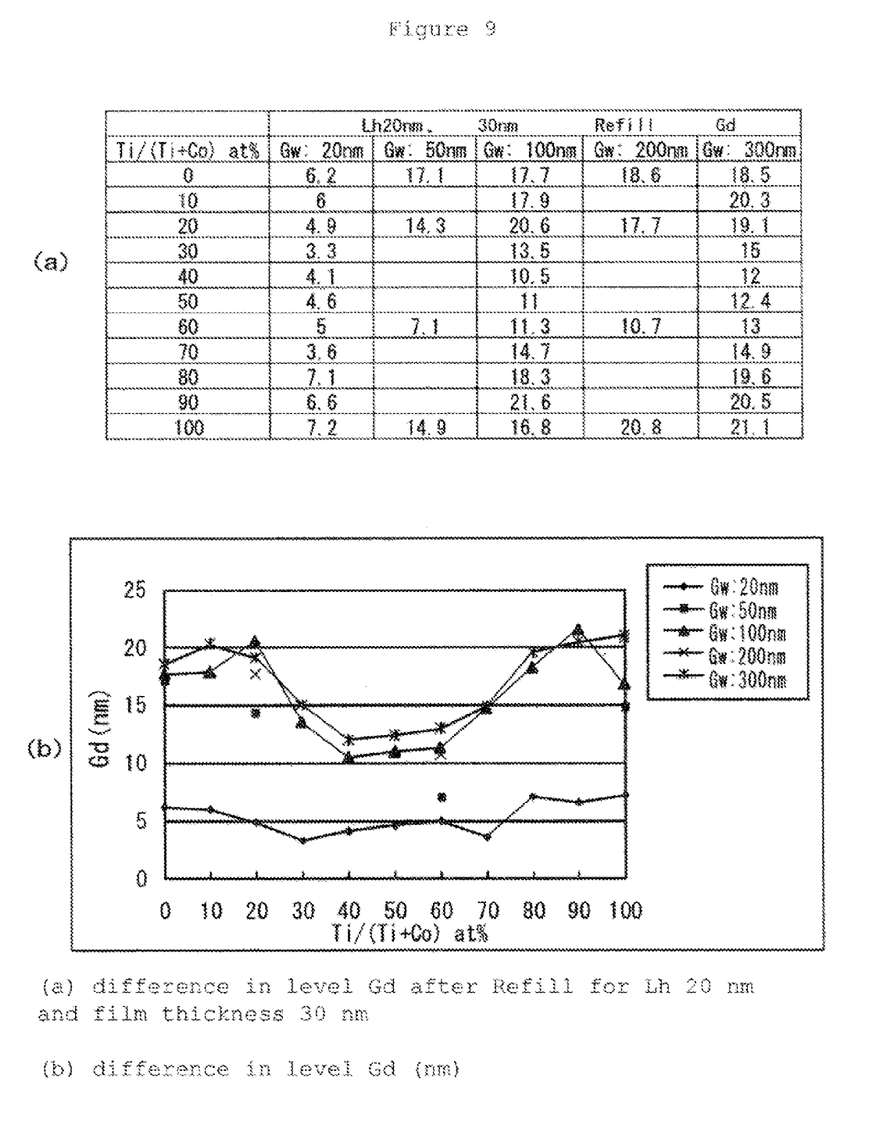
FIGS. 9(a) and 9(b) illustrate the dependency of the difference in level Gd on the Ti compositional proportion when TiCo alloy is used as the back-fill material with a magnetic film processed depth of 20 nm and a back-fill film thickness of 30 nm in the magnetic recording medium according to a second exemplary embodiment, where 9(a) shows data and 9(b) is a graph produced from the data in 9(a).

A second exemplary embodiment is described below with the aid of FIGS. 9(a) and 9(b). It should be noted that any content which is not disclosed in this exemplary embodiment but which was disclosed in the first exemplary embodiment may be applied in the same way in the second exemplary embodiment, below.

Samples were produced in the same way as in the first exemplary embodiment, except that a TiCo target was used to form an alloy thin film of 30 nm when the alloy thin film was formed on the processed magnetic film surface. The Ti compositional proportion of the alloy target was 10 at %, 20 at %, 30 at %, 40 at %, 50 at %, 60 at %, 70 at %, 80 at %, and 90 at %. FIGS. 9(a) and 9(b) illustrate the Ti compositional proportion dependency of the difference in level Gd for each Gw, where 9(a) shows data and 9(b) is a graph produced from the data in 9(a).

In this case too, when there was between 30 at % and 70 at % of Ti, Gd could be kept to 15 nm or less, despite the fact that these were regions where normally, simple back-fill does not produce planarization with Gw at high levels of 100 nm, 200 nm, and 300 nm. When there was between about 40 at % and about 60 at % of Ti in particular, Gd could be kept to 13 nm or less. In other words, it is clear that TiCo alloy is an effective material for back-fill and planarization, and a compositional proportion of Ti exhibiting amorphous properties of between about 30 at % and about 70 at %, in particular between about 40 at % and about 60 at %, is effective.

The samples were etched by IBE or a GCIB in the same way as in the first exemplary embodiment, and the excess film thickness of the back-fill film was removed. The difference in level in the recording regions and separating regions could be kept to no more than 2 nm, even in the servo region, and it was possible to obtain a surface shape that had excellent magnetic head floating properties.

As described above, the second exemplary embodiment makes it possible to provide a separated recording region magnetic recording medium which is provided with separating regions comprising a non-magnetic layer between recording regions comprising a ferromagnetic layer, and has excellent magnetic head floating properties even if the in-plane distances between the areas of ferromagnetic layers are different. This exemplary embodiment also makes it possible to provide a method for producing this magnetic recording medium.

Figure 10:
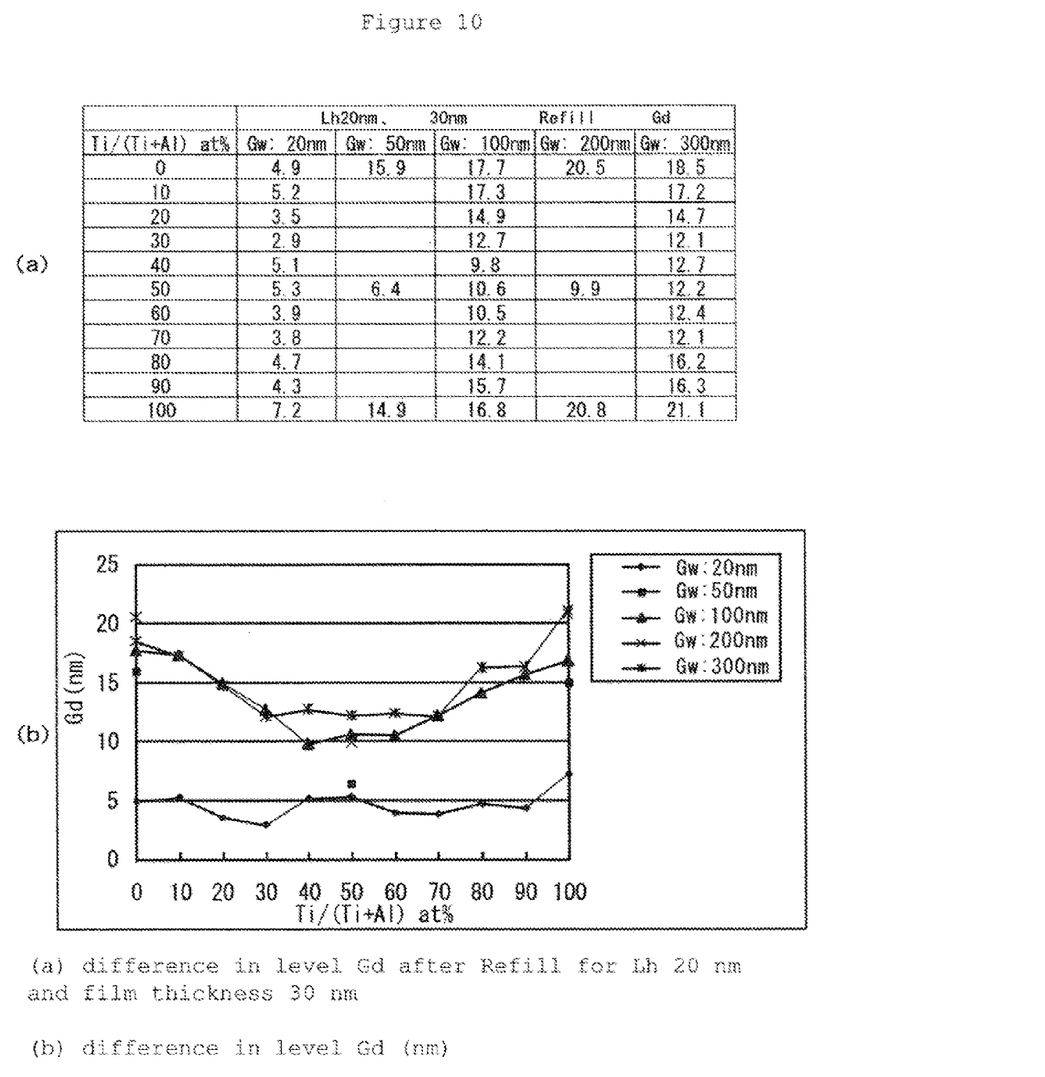
FIGS. 10(a) and 10(b) illustrate the dependency of the difference in level Gd on the Ti compositional proportion when TiAl alloy is used as the back-fill material with a magnetic film processed depth of 20 nm and a back-fill film thickness of 30 nm in the magnetic recording medium according to a third exemplary embodiment, where 10(a) shows data and 10(b) is a graph produced from the data in 10(a).

A third exemplary embodiment is described below with the aid of FIGS. 10(a) and 10(b). It should be noted that any content which is not disclosed in this exemplary embodiment but which was disclosed in the first exemplary embodiment may be applied in the same way in this exemplary embodiment.

Samples were produced in the same way as in the first exemplary embodiment, except that a TiAl target was used to form an alloy thin film of 30 nm when the alloy thin film was formed on the processed magnetic film surface. The Ti compositional proportion of the alloy target was 10 at %, 20 at %, 30 at %, 40 at %, 50 at %, 60 at %, 70 at %, 80 at %, and 90 at %. FIGS. 10(a) and 10(b) illustrate the Ti compositional proportion dependency of the difference in level Gd for each Gw, where 10(*a*) shows data and 10(*b*) is a graph produced from the data in 10(*a*).

In this case, when there was between about 20 at % and about 80 at % of Ti, Gd could be kept to 15 nm or less, despite the fact that these were regions where it could not normally be hoped that simple back-fill could produce planarization with Gw at high levels of 100 nm, 200 nm, and 300 nm. When there was between about 30 at % and about 70 at % of Ti in particular, Gd could be kept to 13 nm or less. In other words, it is clear that TiAl alloy is an effective material for back-fill and planarization, and a compositional proportion of Ti exhibiting amorphous properties of between about 20 at % and about 80 at %, in particular between about 30 at % and about 70 at %, is effective.

The samples were etched by IBE or a GCIB in the same way as in the first exemplary embodiment, and the excess film thickness of the back-fill film was removed. The difference in level in the recording regions and separating regions could be kept to no more than 2 nm, even in the servo region, and it was possible to obtain a surface shape that had excellent magnetic head floating properties.

As described above, this exemplary embodiment makes it possible to provide a separated recording region magnetic recording medium which is provided with separating regions comprising a non-magnetic layer between recording regions comprising a ferromagnetic layer, and has excellent magnetic head floating properties even if the in-plane distances between the areas of ferromagnetic layer are different. This exemplary embodiment also makes it possible to provide a method for producing this magnetic recording medium.

Figure 11:
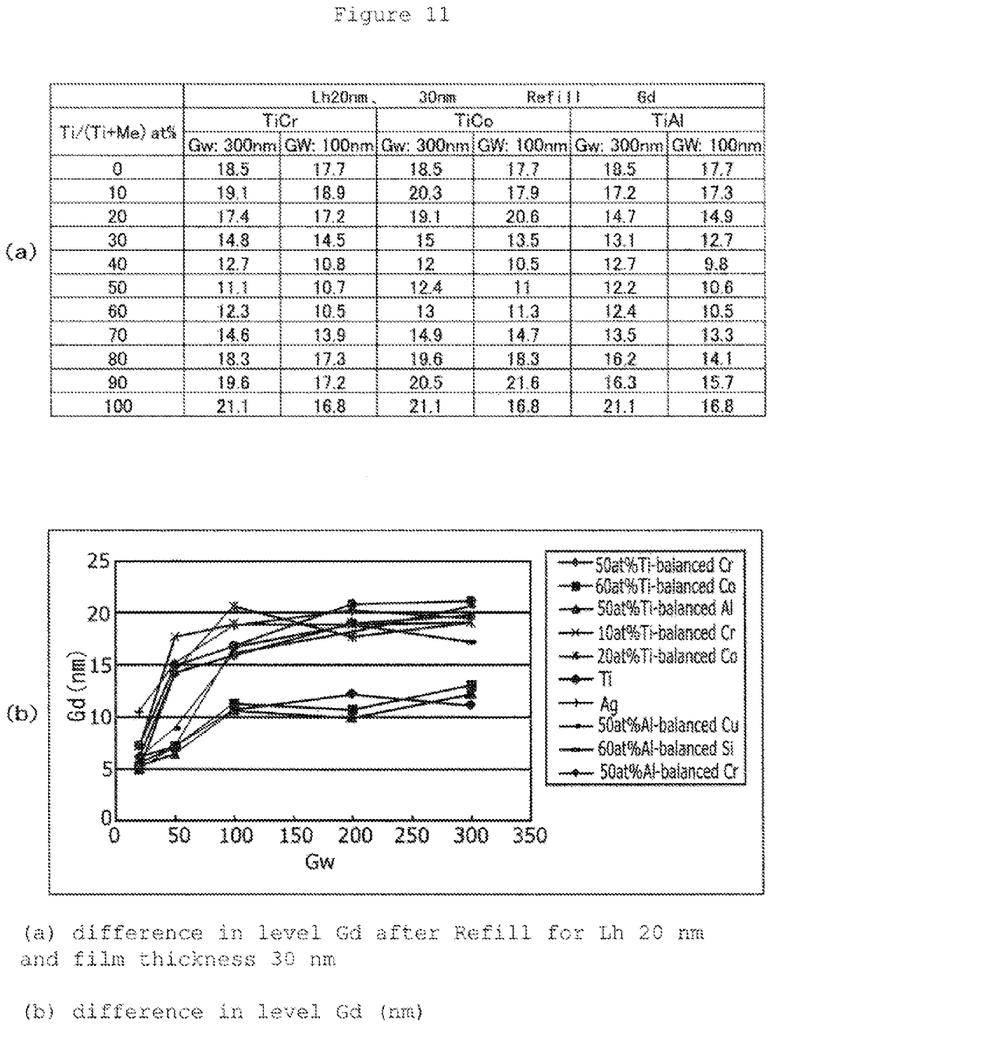
FIGS. 11(a) and 11(b) illustrate the dependency of the difference in level Gd on the width Gw of the separating regions (grooves) processed depth of 20 nm and a with a back-fill magnetic film thickness of 30 nm in the magnetic recording media according to the first to third exemplary embodiments and the comparative example, where 11(a) shows data and 11(b) is the graph produced from the data in 11(a).

FIGS. 11(*a*) and 11(*b*) show the Gw dependency of Gd for three representative examples of the first, second and third exemplary embodiments, two representative examples of alloy compositions outside the scope of the exemplary embodiments, pure Ti, Ag as a comparative example, and three exemplary alloys which do not contain Ti. The film thickness was 30 nm in all cases. In the three representative examples of the exemplary embodiments, Gd was kept to no more than 13 nm, even when Gw was 100 nm or more. On the other hand, with the seven back-fill samples outside the exemplary embodiments, GD reached 15 nm or more when Gw reached 100 nm or more. From this it can be seen that particularly good amorphous alloy including Ti is a material for back-fill and planarization, even for relatively large pattern sizes and pitches.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording medium, comprising:
a patterned magnetic recording layer above a substrate, the patterned magnetic recording layer including recording regions and separating regions for separating the recording regions; and
a non-magnetic alloy layer positioned in the separating regions,
wherein the non-magnetic alloy layer includes Ti,
wherein the non-magnetic alloy layer comprises a TiCr alloy with a compositional proportion of Ti in the TiCr alloy of between about 30 at % and about 70 at %, a TiAl alloy with a compositional proportion of Ti in the TiAl alloy of between about 20 at % and about 80 at %, or a TiCo alloy with a compositional proportion of Ti in the TiCo alloy of between about 20 at % and about 80 at %.

2. A magnetic data storage system, comprising:
at least one magnetic head;
a magnetic recording medium as recited in claim 1;
a drive mechanism for passing the magnetic recording medium over the at least one magnetic head; and
a controller electrically coupled to the at least one magnetic head for controlling operation of the at least one magnetic head.

3. The magnetic recording medium as recited in claim 1, wherein the non-magnetic alloy layer is amorphous.

4. The magnetic recording medium as recited in claim 3, wherein the non-magnetic alloy layer has a difference in surface level (Gd) of less than about 15 nm.

5. The magnetic recording medium as recited in claim 4, wherein the non-magnetic alloy layer comprises a TiCr alloy and has a difference in surface level (Gd) of less than about 13 nm.

6. The magnetic recording medium as recited in claim 5, wherein the compositional proportion of Ti in the TiCr alloy is between about 40 at % and about 60 at %.

7. The magnetic recording medium as recited in claim 4, wherein the non-magnetic alloy layer comprises a TiAl alloy and has a difference in surface level (Gd) of less than about 13 nm.

8. The magnetic recording medium as recited in claim 7, wherein the compositional proportion of Ti in the TiAl alloy is between about 30 at % and about 70 at %.

9. The magnetic recording medium as recited in claim 4, wherein the non-magnetic alloy layer comprises a TiCo alloy and has a difference in surface level (Gd) of less than about 13 nm.

10. The magnetic recording medium as claimed in claim 9, wherein the compositional proportion of Ti in the TiCo alloy is between about 30 at % and about 70 at %.

11. The magnetic recording medium as recited in claim 1, further comprising an interlayer comprising Ru interposed between the substrate and the patterned magnetic recording layer.

12. The magnetic recording medium as recited in claim 11, wherein the non-magnetic alloy layer is amorphous.

13. The magnetic recording medium as recited in claim 12, wherein the non-magnetic alloy layer comprises a TiCr alloy, wherein a compositional proportion of Ti in the TiCr alloy is between about 30 at % and about 70 at %.

14. The magnetic recording medium as recited in claim 12, wherein the non-magnetic alloy layer comprises a TiAl alloy, wherein a compositional proportion of Ti in the TiAl alloy is between about 20 at % and about 80 at &.

15. The magnetic recording medium as recited in claim 12, wherein the non-magnetic alloy layer comprises a TiCo alloy, wherein a compositional proportion of Ti in the TiCo alloy is between about 20 at % and about 80 at %.

16. A magnetic data storage system, comprising:
at least one magnetic head;
a magnetic recording medium as recited in claim 12;
a drive mechanism for passing the magnetic medium over the at least one magnetic head; and
a controller electrically coupled to the at least one magnetic head for controlling operation of the at least one magnetic head.

17. A method for producing a magnetic recording medium, the method comprising:

forming separating regions in a magnetic recording layer by removing portions of the magnetic layer, wherein the separating regions separate recording regions in the magnetic layer; and depositing a non-magnetic alloy layer in the separating regions, wherein the non-magnetic alloy layer comprises a TiCr alloy with a compositional proportion of Ti in the TiCr alloy of between about 30 at % and about 70 at %, a TiAl alloy with a compositional proportion of Ti in the TiAl alloy of between about 20 at % and about 80 at %, or a TiCo alloy with a compositional proportion of Ti in the TiCo alloy of between about 20 at % and about 80 at %.

18. The method as recited in claim 17, wherein the depositing comprises sputtering the non-magnetic alloy layer employing a substrate bias.

19. The method as recited in claim 17, wherein the non-magnetic, alloy layer is amorphous.

20. A magnetic recording medium, comprising:
a ferromagnetic layer for recording data or servo signal data;
separating regions disposed between areas of the ferromagnetic layer; and
a non-magnetic alloy layer positioned in each of the separating regions,
wherein the separating regions comprise a number of regions having, one or more different widths, and
wherein the non-magnetic alloy comprises a TiCr alloy with a compositional proportion of Ti in the TiCr alloy of between about 30 at % and about 70 at %, a TiAl alloy with a compositional proportion of Ti in the TiAl alloy of between about 20 at % and about 80 at %, or a TiCo alloy with a compositional proportion of Ti in the TiCo alloy of between about 20 at % and about 80 at %.

21. The magnetic recording medium as recited in claim 20, wherein the non-magnetic alloy layer is amorphous.

22. A magnetic data storage system, comprising:
at least one magnetic head;
a magnetic recording medium as recited in claim 20;
a drive mechanism for passing the magnetic medium over the at least one magnetic head; and
a controller electrically coupled to the at least one magnetic head for controlling operation of the at least one magnetic head.

23. A magnetic recording medium, comprising:
a data track region for storing data, the data track region comprising;
  first separating regions, each first separating region having a first width; and
  a ferromagnetic layer for recording data positioned separately adjacent to the first separating regions; and
a servo region for storing servo data for controlling head position, the servo region comprising:
  second separating regions having a number of widths greater than the first width;
a ferromagnetic layer positioned separately adjacent to the second separating regions; and
a non-magnetic alloy layer positioned in each of the first separating regions and the second separating regions,
wherein the non-magnetic alloy comprises a TiCr alloy with a compositional proportion of Ti in the TiCr alloy of between about 30 at % and about 70 at %, a TiAl alloy with a compositional proportion of Ti in the TiAl alloy of between about 20 at % and about 80 at %, or a TiCo alloy with a compositional proportion of Ti in the TiCo alloy of between about 20 at % and about 80 at %.

24. The magnetic recording medium as recited in claim 23, wherein the non-magnetic alloy layer is amorphous.

25. A magnetic data storage system, comprising:
at least one magnetic head;
a magnetic recording medium as recited in claim 23;
a drive mechanism for passing the magnetic medium over the at least one magnetic head; and
a controller electrically coupled to the at least one magnetic head for controlling operation of the at least one magnetic head.

* * * * *

UNITED STATES PATENT AND TRADEMARK OFFICE
CERTIFICATE OF CORRECTION

| | | |
|---|---|---|
| PATENT NO. | : 8,599,509 B2 | Page 1 of 1 |
| APPLICATION NO. | : 12/917372 | |
| DATED | : December 3, 2013 | |
| INVENTOR(S) | : Ono et al. | |

It is certified that error appears in the above-identified patent and that said Letters Patent is hereby corrected as shown below:

In the specification:

col. 9, line 22 replace "HG. 6." with --FIG. 6.--.

Signed and Sealed this
Twenty-fifth Day of February, 2014

Michelle K. Lee
*Deputy Director of the United States Patent and Trademark Office*